(12) United States Patent
Miller et al.

(10) Patent No.: US 7,988,107 B2
(45) Date of Patent: Aug. 2, 2011

(54) STEMWARE HOLDER FOR AN AUTOMATIC DISHWASHER

(75) Inventors: Kevin B. Miller, Lawton, MI (US);
Danielle Marie Hafling, Saint Joseph, MI (US); John Irven Smith, Coloma, MI (US); Sandra C. Steward, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 657 days.

(21) Appl. No.: 11/852,481

(22) Filed: Sep. 10, 2007

(65) Prior Publication Data

US 2009/0065455 A1    Mar. 12, 2009

(51) Int. Cl.
*F16M 11/00* (2006.01)

(52) U.S. Cl. .......... 248/176.1; 248/295.11; 248/288.11; 248/296.1; 403/252; 403/253; 211/41.9; 211/197; 211/100

(58) Field of Classification Search ............... 248/316.1, 248/124.2, 313, 316.5, 316.6, 316.7, 540, 248/541, 229.1, 229.12, 176.3, 224.7, 295.11, 248/297.31, 297.51, 124.1, 125.1, 125.3, 248/230.7, 231.81, 229.16, 125.7, 125.9, 248/145; 211/41.8, 41.9, 196, 197, 205, 211/99, 100, 1.3, 163; 403/252, 253, 254, 403/1
See application file for complete search history.

(56) References Cited

U.S. PATENT DOCUMENTS

| | | | |
|---|---|---|---|
| 653,305 A * | 7/1900 | Mallard | 248/97 |
| 845,739 A * | 3/1907 | Allson | 211/33 |
| 896,990 A * | 8/1908 | Hill | 248/125.3 |
| 1,460,721 A * | 7/1923 | Lister | 248/240.4 |
| 1,643,661 A * | 9/1927 | Kendall | 248/113 |
| 2,655,191 A * | 10/1953 | Partin | 269/54.4 |
| 3,318,457 A * | 5/1967 | Krasnoff | 211/74 |
| 3,612,285 A | 10/1971 | Mason | |
| 4,635,799 A | 1/1987 | Penner | |
| 4,927,033 A * | 5/1990 | Patera et al. | 211/41.9 |
| 4,974,806 A * | 12/1990 | Matern | 248/499 |
| 5,141,192 A * | 8/1992 | Adams | 248/231.81 |
| 5,249,590 A * | 10/1993 | Jacobus et al. | 134/135 |
| 5,400,990 A * | 3/1995 | Frankel | 248/215 |
| 5,405,018 A | 4/1995 | Anthrop, Jr. | |
| 5,580,025 A * | 12/1996 | Cross | 248/507 |
| 5,727,764 A * | 3/1998 | Angeles | 248/295.11 |
| 5,918,749 A * | 7/1999 | Pille et al. | 211/41.9 |
| 6,364,131 B1 | 4/2002 | Moylan | |
| 6,394,285 B1 | 5/2002 | Arthurs et al. | |
| 6,827,225 B2 * | 12/2004 | Miilu et al. | 211/41.9 |
| 7,458,471 B2 * | 12/2008 | Crudgington, Jr. | 211/41.9 |
| 7,523,902 B2 * | 4/2009 | Almeida | 248/229.13 |
| 7,556,231 B2 * | 7/2009 | Herbst et al. | 248/316.1 |
| 2005/0236345 A1 * | 10/2005 | Herbst et al. | 211/41.9 |
| 2008/0156750 A1 * | 7/2008 | Richardson | 211/41.9 |

* cited by examiner

*Primary Examiner* — Kimberly T Wood
(74) *Attorney, Agent, or Firm* — Robert A. Bacon; McGarry Bair PC

(57) ABSTRACT

A stemware holder for holding a stem of a stemware in a wire-frame dish rack. The dish rack comprises a bottom wall formed by wires with multiple tines extending from the bottom wall. The stemware holder comprises a stem holder configured to hold the stem, a rack mount configured to couple the stem holder to the dish rack, and a radial lock configured to releasably hold the stem holder at multiple radial positions relative to an axis generally perpendicular to the bottom wall when the stemware holder is mounted to the rack.

10 Claims, 6 Drawing Sheets

STEMWARE HOLDER FOR AN AUTOMATIC DISHWASHER

BACKGROUND OF THE INVENTION

1. Field of the Invention

The invention relates generally to a stemware holder for supporting stemware in automatic dishwasher racks.

2. Description of the Related Art

Automatic dishwashers usually have one or more wire dishwasher racks for supporting dishes, pots and pans, glassware, and other cooking and dining utensils within the dishwasher. The dish racks are typically provided with a variety of features for holding the various sizes and shapes of utensils that may be washed. These include wire tines extending vertically upwardly from the floor of the dish rack. Glassware, such as tumblers, drink ware, juice glasses, mugs, and the like, can be placed over or between the tines to support the glassware in a downwardly open position for effective washing and rinsing.

Stemware is also frequently washed in an automatic dishwasher. However, the typical stemware configuration, i.e. a cup supported on a long pedestal with a widened base, makes the stemware somewhat unstable in a typical dishwashing rack. The pedestal and base tend to make the overturned glass top-heavy. Furthermore, the dishwashing spray jets can send a forceful stream of dishwashing liquid against the widened base, causing the stemware to flip over. Stemware is frequently fabricated of fine crystal or thin glass, making it more susceptible to breakage than other glassware. Therefore, it is desirable to prevent the stemware from falling over.

Prior stemware holders for dishwashing racks include a spring-biased clip for gripping the stem. Such clips are susceptible to breakage after repeated flexing and repeated exposure to heating cycles of the dishwasher. Holders may also include hook-like supports which encircle the stem. However, the hooks may be inflexible or have too small a diameter to fit around certain stemware. Also, the repeated heating from the dishwasher can cause a permanent expansion of the hook that is sufficient enough to permit the stem to fall out of the hook. Several of the prior stemware holders are not vertically adjustable and cannot accommodate all sizes of stemware.

There is a need for a stemware holder which can be readily attached and detached from a dishwashing rack, and can be readily oriented relative to the dishwashing rack in order to optimize the space occupied by the stemware.

SUMMARY OF THE INVENTION

A stemware holder for holding a stem of a stemware in a wire-frame dish rack. The dish rack comprises a bottom wall formed by wires with multiple tines extending from the bottom wall. The stemware holder comprises a stem holder configured to hold the stem, a rack mount configured to couple the stem holder to the dish rack, and a radial lock configured to releasably hold the stem holder at multiple radial positions relative to an axis generally perpendicular to the bottom wall when the stemware holder is mounted to the rack.

DESCRIPTION OF AN EMBODIMENT OF THE INVENTION

Figure 1:
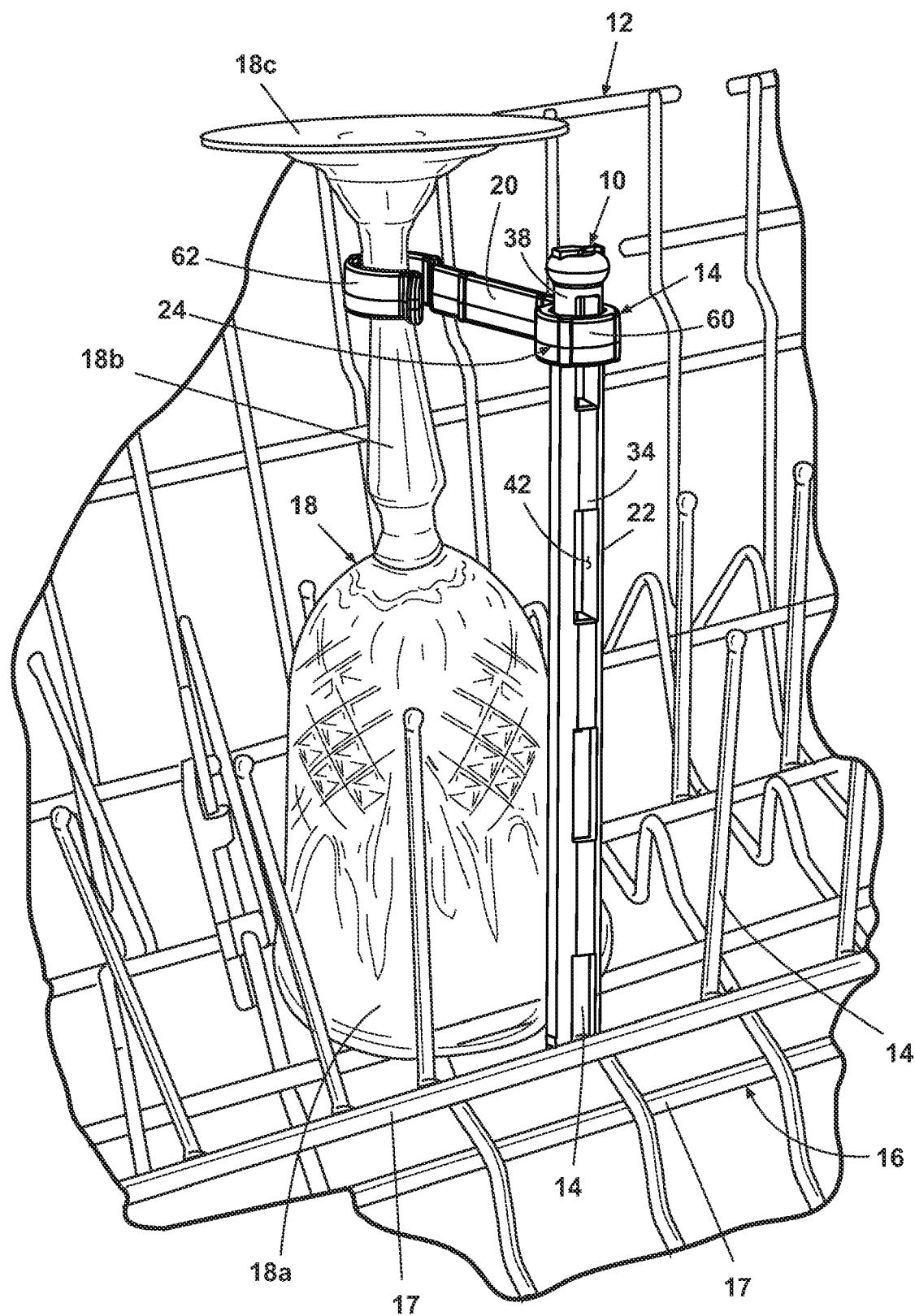
FIG. 1 is a perspective view of an embodiment of a stemware holder according to the invention having a rack mount and stem holder for holding a piece of stemware in a dishwashing rack.

Referring to FIG. 1, an embodiment of a stemware holder 10 is illustrated according to the invention. The stemware holder 10 is illustrated supporting a piece of stemware 18 in a well-known wire dish rack 12 having a bottom wall 16 with a plurality of generally horizontal wires 17 and a plurality of upright wire tines 14 extending from the bottom wall 16. The stemware 18 is illustrative and may include a cup 18*a*, stem 18*b*, and a base 18*c*. The stemware holder 10 may be a two-piece assembly having a stem holder 20 coupled with a rack mount 22 through a radial lock 24 as hereinafter described.

Figure 2:
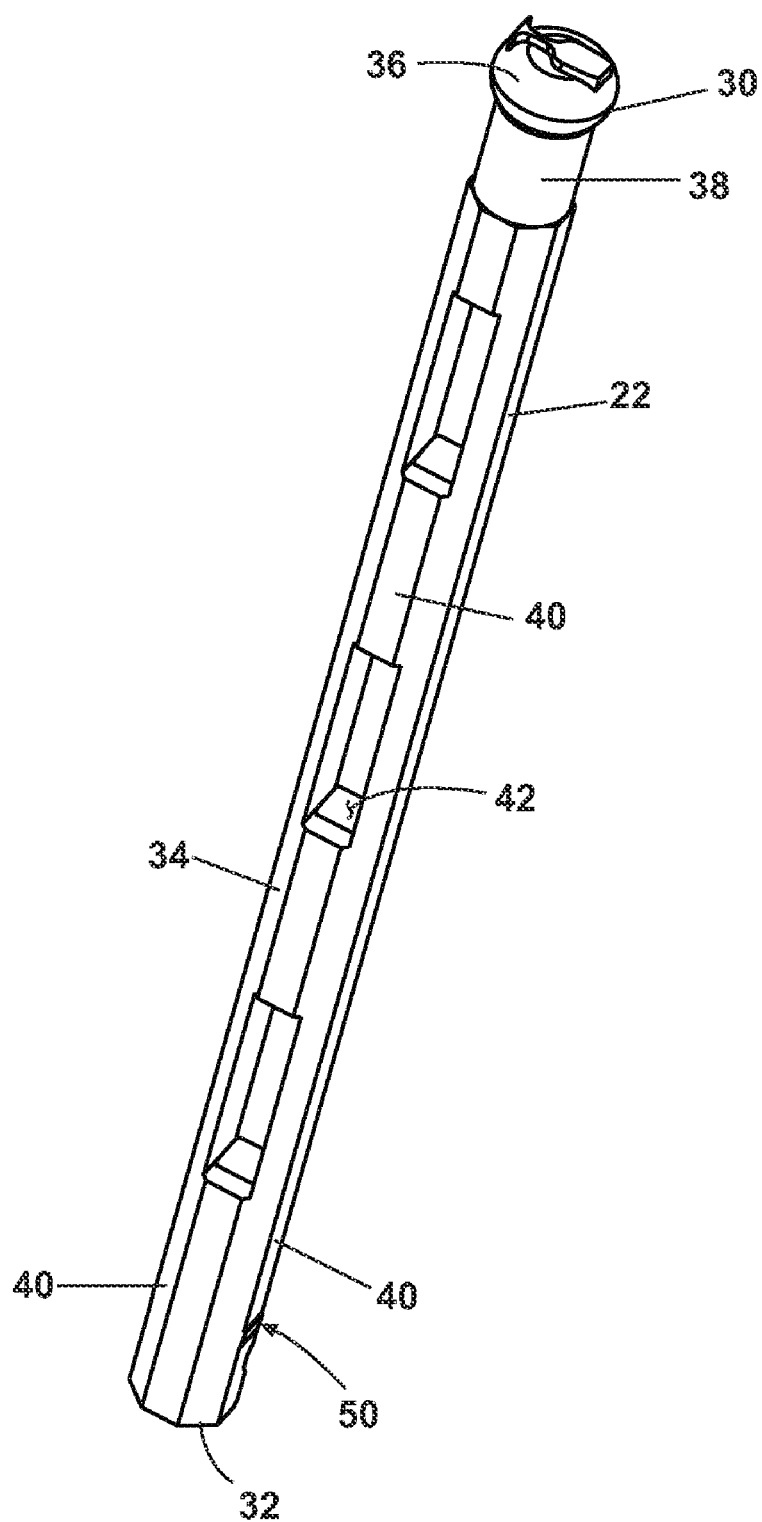
FIG. 2 is a perspective view of the rack mount of the stemware holder illustrated in FIG. 1.

Referring now to FIG. 2, the rack mount 22 may be an elongated member having a stop end 30, a lock end 32, and a generally annular peripheral wall 34 extending therebetween. The stop end 30 terminates in an end cap 36 having lateral dimensions greater than the lateral dimensions of the peripheral wall 34 to function as a stop. The peripheral wall 34 defines a longitudinal channelway 42 extending therethrough to form a sleeve configured for slidable registry with a tine 14. The lock end 32 may be open to the channelway 42. The lock end 32 may include a pair of diametrically opposed stops 50 (only one of which is illustrated in FIG. 2) for preventing the removal of the stem holder 20 from the rack mount 22. The peripheral wall 34 may have a polygonal cross section defining a plurality of planar faces 40 forming a multi-faceted portion of the rack mount 22. The peripheral wall 34 is illustrated in the figures as octagonal, although other configurations, such as hexagonal, may be utilized.

Figure 3:
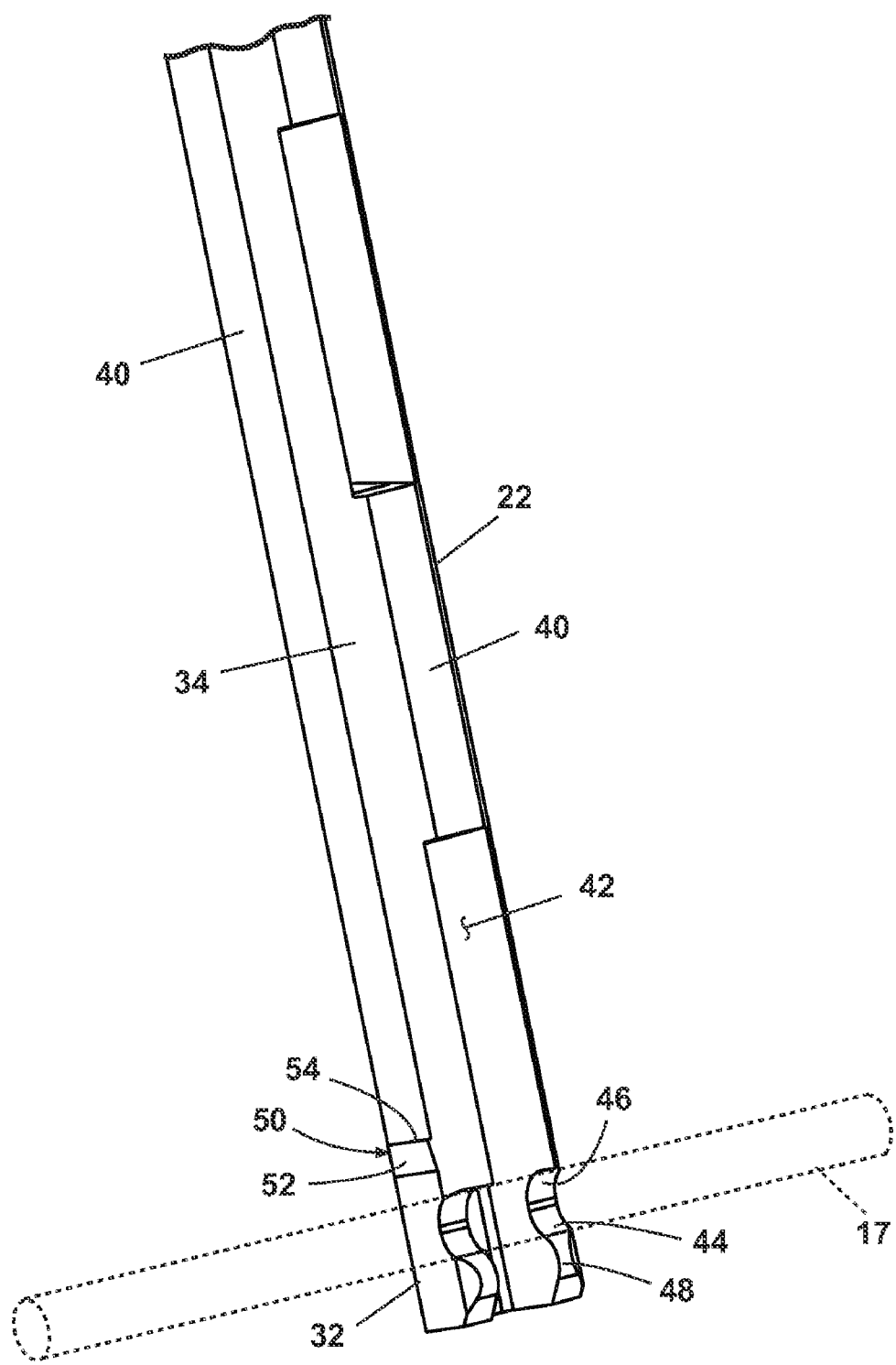
FIG. 3 is an enlarged perspective view of a lower portion of the rack mount illustrated in FIG. 2.

Referring to FIG. 3, the lock end 32 terminates in a pair of somewhat S-shaped curved surfaces forming a wire mount 44, each having a recess 46 and a projection 48. The recesses 46 are configured as a clip for cradling of a dish rack wire therein orthogonal to the longitudinal axis of the rack mount 22. The stops 50 (only one of which is illustrated in FIG. 3) are positioned adjacent the wire mount 44 opposite the lock end 32. The stops 50 may have a beveled surface 52 inclined outwardly away from the planar face 40 toward the stop end 30, and may terminate in a shoulder 54 orthogonal to the planar face 40.

Figure 4:
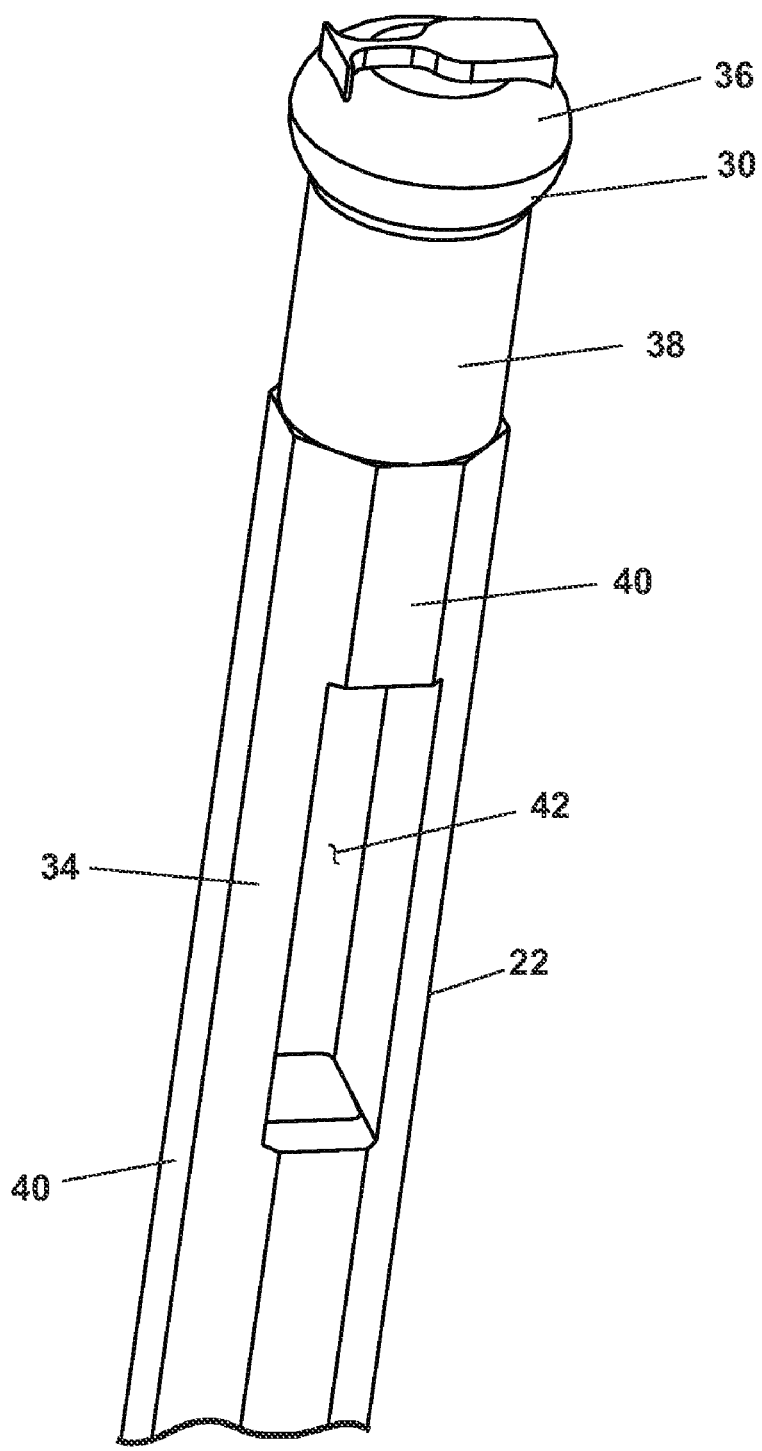
FIG. 4 is an enlarged perspective view of an upper portion of the rack mount illustrated in FIG. 2.

Referring to FIG. 4, the peripheral wall 34 transitions at the stop end 30 in a cylindrical wall 38, forming a non-faceted portion of the rack mount 22, interposed between the peripheral wall 34 and the end cap 36. The lateral dimension, i.e. the diameter, of the cylindrical wall 38 may be somewhat less than the lateral dimension of the peripheral wall 34.

Figure 5:
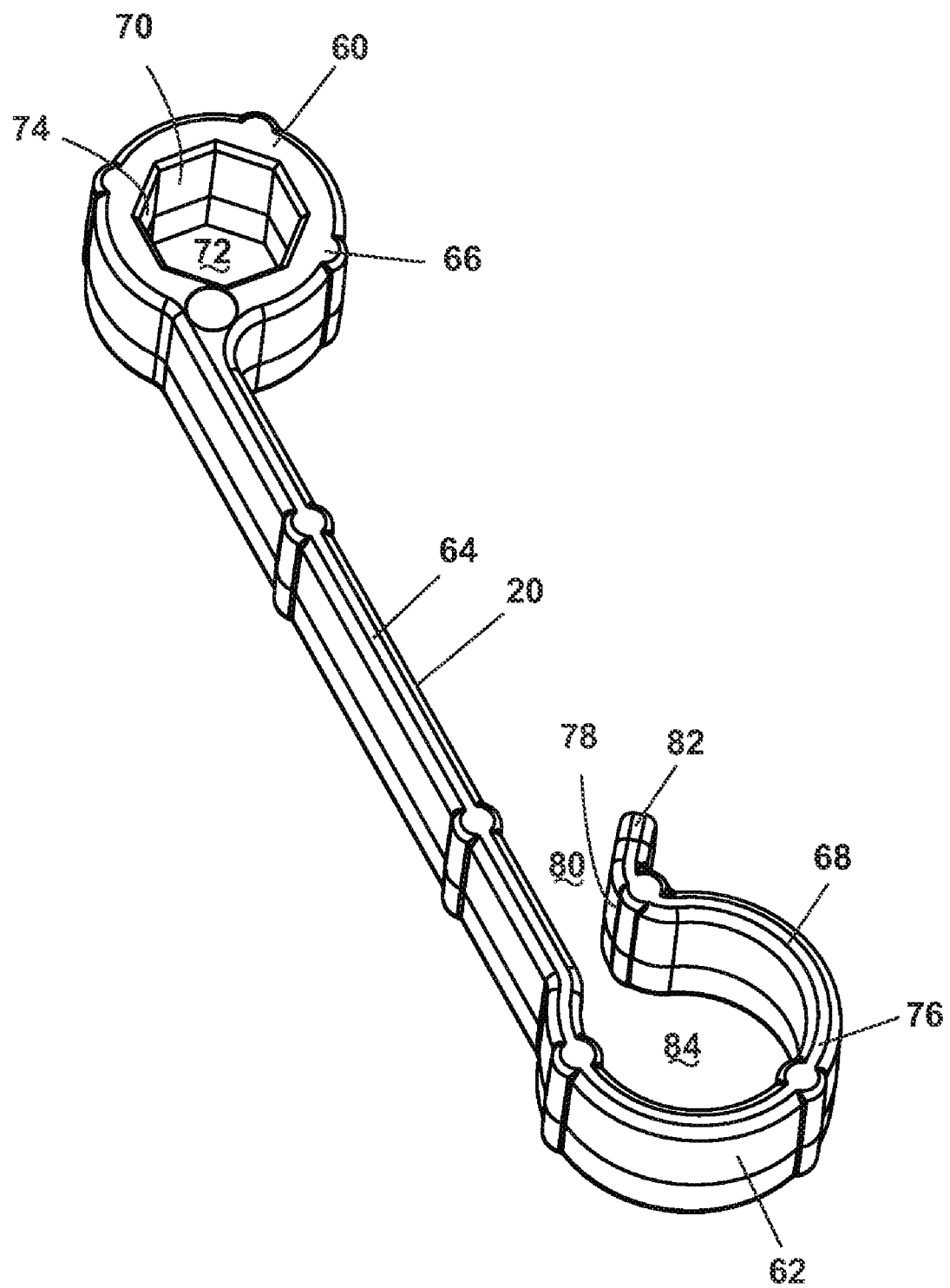
FIG. 5 is a perspective view of a stem holder comprising an element of the stemware holder illustrated in FIG. 1.

Referring now to FIG. 5, the stem holder 20 may be an elongated member having a coupler 60 at a first end and a stem holder 62 at a second end joined by a connector 64. The coupler 60 may be a ring 66 having a wall 70 defining an aperture 72 therethrough. The wall 70 may have an inner surface defined by a plurality of surfaces 74 to form a polygonal configuration, forming a multi-faceted aperture, which is complementary to the polygonal cross section of the rack mount 22. Thus, for example, the aperture 72 defines an octagon if the peripheral wall 34 has an octagonal cross section. The aperture 72 and planar surfaces 74 are configured for slidable registry with the planar faces 40 of the peripheral wall 34. The aperture 72 in registry with the peripheral wall 34 forms the radial lock 24 which prevents the stem holder 20 from rotating relative to the rack mount 22 when the aperture 72 may be slidably disposed over the peripheral wall 34. Additionally, the aperture 72 and the cylindrical wall 38 are configured so that the stem holder 20 may be rotated about the cylindrical wall 38 when the stem holder 20 is translated along the peripheral wall 34 to the cylindrical wall 38. It is worth noting that while the aperture 72 is complementary with the polygonal cross section, it is not necessary for the aperture and polygonal cross section to be complementary to function as a radial lock.

The stem holder 62 may be a hook 68 having a semicircular wall 76 terminating adjacent the connector 64 in a lip 82 inclined away from the connector 64 to form a constriction 78 defining a throat 80 entering into an opening 84 partially circumscribed by the wall 76. The hook 86 may be configured so that the lip 82 may be flexibly urged away from the connector 64 by a force applied to the constriction 78, such as by inserting the stem 18b of a piece of stemware into the throat 80. In this way, the wall 76 will deflect during insertion of the stem 18b through the throat 80 and into the opening 84. The opening 84 may be sized such that the stem 18b is loosely held within the opening.

The stem holder 20 may be fabricated of any suitable material having sufficient strength and durability for the purposes described herein. Preferably, the stem holder 20 may be fabricated of a plastic resistant to deterioration through the repeated exposure to a hot, wet environment characteristic of a dishwasher. A suitable plastic material may be an acetal copolymer, such as Celcon® M 90-34 manufactured by the Ticona unit of Celanese Corporation. The material should have sufficient resiliency to enable the wall 76 to flex outwardly as the stem 18b may be inserted into the throat 80 and to return to an at-rest position.

Referring again to FIG. 1, the stemware holder 10 may be assembled by slidably inserting the lock end 32 of the rack mount 22 into the aperture 72 of the coupler 60, and sliding the stem holder 20 over the stops 50 and along the rack mount 22. The inclined surfaces 52 of the stops 50 may enable the coupler 60 to move past the stops 50 toward the stop end 30, and the shoulders 54 may prevent the coupler 60 from moving past the stops 50 and off the lock end 32. Alternatively, the stops 50 may be omitted in order to enable the stem holder 20 to be separated from the rack mount 22 for storage convenience.

The rack mount 22 may then be coupled with the dish rack 12 by inserting a tine 14 into the channelway 42. The rack mount 22 may be moved over the tine 14 until an adjacent horizontal wire 17 in the bottom wall 16 of the dish rack 12 may be received within the recesses 46 of the wire mount 44. This secures the stemware holder 10 to the dish rack 12 and prevents the inadvertent rotation of the rack mount 22 about the tine 14. Additionally, the stem holder 20 will be prevented from rotating relative to the rack mount 22 by the radial lock 24 formed by the engagement of the planar faces 40 with the planar surfaces 74.

Figure 6:
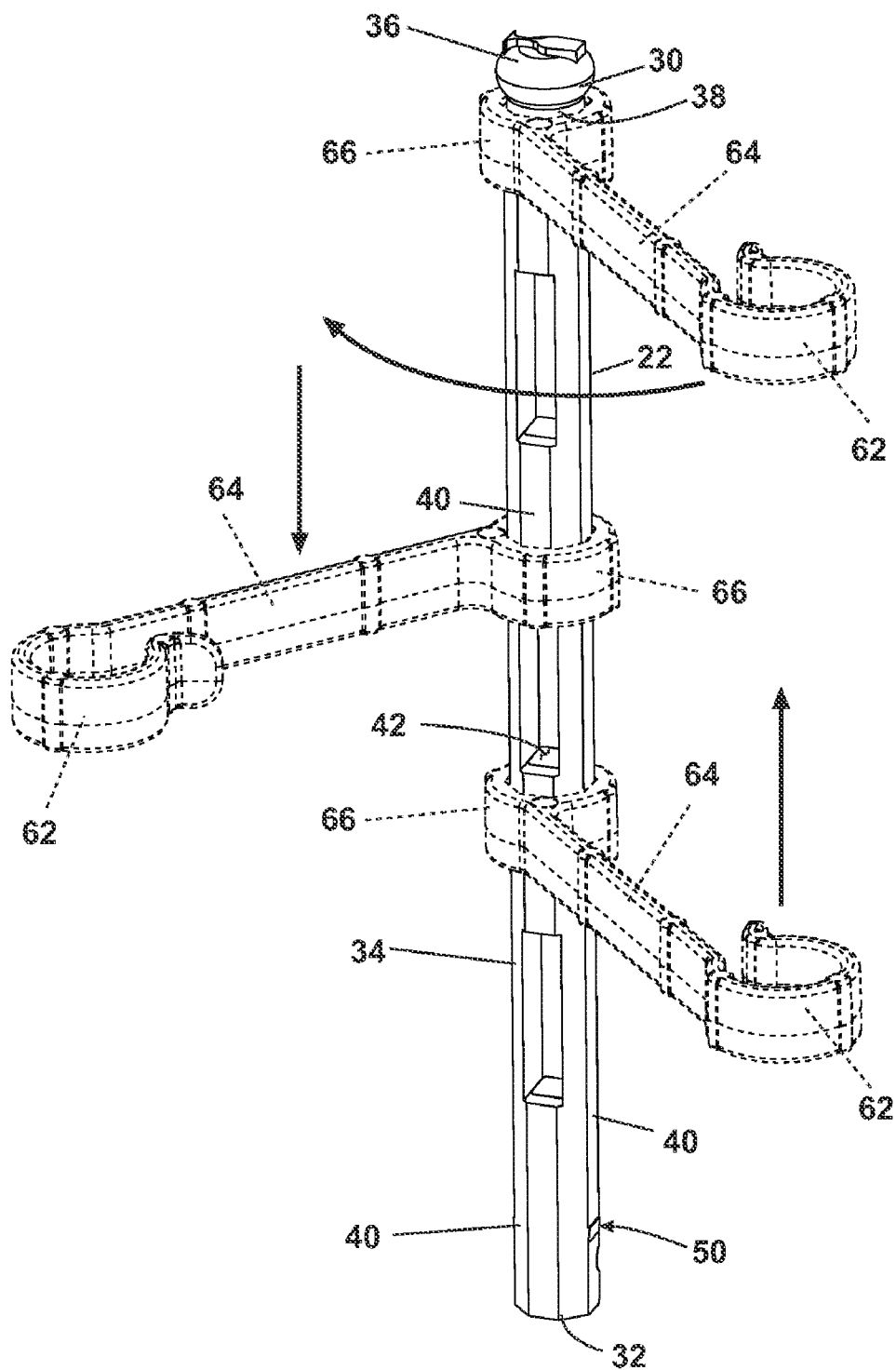
FIG. 6 is a perspective view of the rack mount illustrated in FIG. 1 with the stem holder shown in phantom in exemplary vertical and radial positions along the rack mount.

As illustrated in FIG. 6, to vertically adjust the position of the stem holder 20, the stem holder 20 may be slidably translated along the rack mount 22 for attachment of the stemware 18 at a selected height. The stemware 18 can then be coupled with the stemware holder 10 by inserting the stem 18b into the hook 68 of the stem holder 20. To radially adjust the position of the stem holder 20 relative to the rack mount 22, the stem holder 20 may be slidably translated along the peripheral wall 34 to the cylindrical wall 38, rotated to a selected position. The end cap 36 prevents the stem holder 20 from inadvertently being removed from the rack mount 22. The stem holder 20 can then be slidably translated into engagement with the peripheral wall 34 to "lock" the stem holder 20 to the rack mount 22. The radial adjustment of the stem holder 20 aids in adjusting the position of the stem holder 62 relative to the tine on which the rack mount is coupled. As the distance is fixed between the coupler 60 and the stem holder 62, the radial adjustment compensates for the variability in the lateral position of the stem 18b relative to the tine on which the rack mount 22 is coupled, which aids in accommodating different sized stemware.

The stemware holder 10 is a simple but effective assembly for securely supporting stemware in a dishwasher. The stemware holder 10 may be set to support stemware at a preselected location without the necessity of moving the stemware holder 10 among a plurality of tines. The radial lock 24 maintains the stemware holder 10 at the preselected location and prevents the lateral movement of the stemware during the washing cycle, and while the rack 12 is moved into and out of the dishwasher. The position of the stemware may be easily adjusted by raising the stem holder 20 along the rack mount 22 to the cylindrical wall 38 to disengage the radial lock 24 so that the stem holder 20 may be rotated to a new position. The wire mount 44 of the rack mount 22 secures the stemware holder 20 in the dish rack 12. When not needed, the stemware holder 10 may be readily removed from the dish rack 12, separated into its component parts if the stops 50 are omitted, and easily stored in either an assembled or separated configuration.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A stemware holder for holding a stem of a stemware in a wire-frame dish rack comprising a bottom wall formed by wires with multiple tines extending from the bottom wall, the stemware holder comprising:
   a rack mount comprising an elongated body defining a longitudinal axis and having an exterior defined by a multi-faceted portion and a non-faceted portion, and configured to mount to the dish rack;
   a stem holder configured to hold the stem and having a multi-faceted aperture complementary with the multi-faceted portion such that the multi-faceted aperture slidably receives the elongated body and the stem holder is slidable between the multi-faceted and non-faceted portions; and
   a radial lock formed by the multi-faceted portion, multi-faceted aperture, and the non-faceted portion wherein the radial lock is placed in a locked condition that prevents the relative rotation of the stem holder and rack mount by sliding the multi-faceted aperture onto the multi-faceted portion, and the radial lock is placed in an unlocked condition where the stem holder is free to rotate relative to the rack mount by sliding the multi-faceted aperture onto the non-faceted portion.

2. The stemware holder according to claim 1, wherein the elongated body comprises a sleeve that is configured to be slidably received over a tine of the rack.

3. The stemware holder according to claim 2, wherein the sleeve terminates in a stop that prevents the stem holder from being slid off of the sleeve.

4. The stemware holder according to claim 3, wherein the sleeve comprises a wire mount configured to releasably connect the sleeve to the rack.

5. The stemware holder according to claim 4, wherein the wire mount comprises a clip formed in the sleeve and configured to clip to a wire in the bottom wall.

6. The stemware holder according to claim 1, wherein the stem holder comprises a shaft terminating in the multi-faceted aperture on one end and a hook on the other end.

7. The stemware holder according to claim 6, wherein the hook is resilient and partially circumscribes an interior sized to receive the stemware and defines an opening to the interior that is small enough to require the deflection of the hook when the stem is inserted through the opening into the interior.

8. The stemware holder according to claim 7, wherein the hook is sized such that a stem will be loosely held within the interior.

9. The stemware holder according to claim 7, wherein the hook is configured such that after repeated exposure to a heating and cooling of a dishwasher cycle, the relative sizing of the interior and opening are not substantially changed.

10. The stemware holder according to claim 7, wherein at least a portion of the hook comprises an acetal copolymer.

* * * * *